Figure 1:
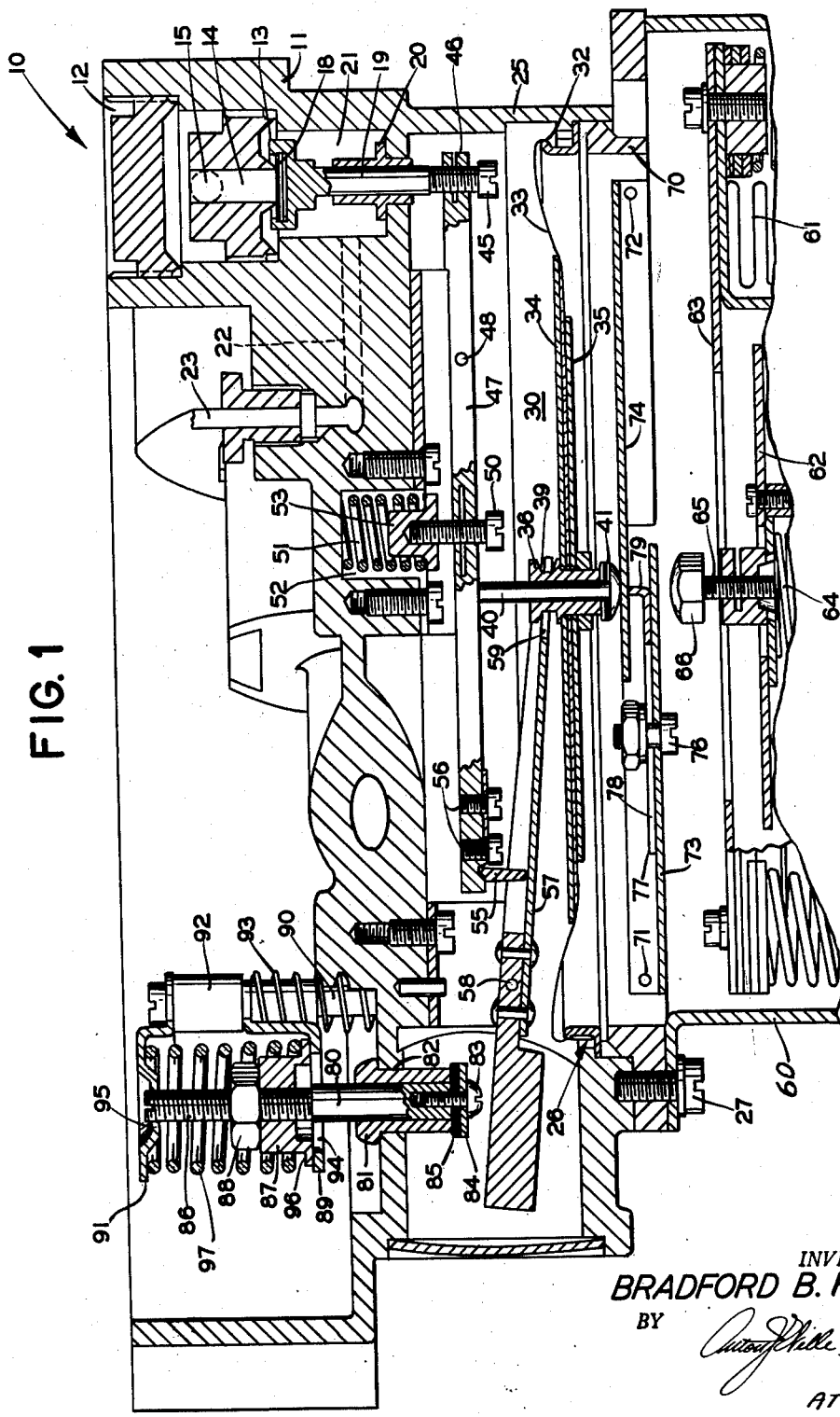

Sept. 2, 1952     B. B. HOLMES     2,608,971
DEMAND VALVE CONTROL MECHANISM
Filed Nov. 17, 1948     2 SHEETS—SHEET 1

INVENTOR.
BRADFORD B. HOLMES
BY
ATTORNEY

Sept. 2, 1952     B. B. HOLMES     2,608,971
DEMAND VALVE CONTROL MECHANISM
Filed Nov. 17, 1948     2 SHEETS—SHEET 2

INVENTOR.
BRADFORD B. HOLMES
BY
- ATTORNEY -

Patented Sept. 2, 1952

2,608,971

UNITED STATES PATENT OFFICE 2,608,971

DEMAND VALVE CONTROL MECHANISM

Bradford B. Holmes, New York, N. Y., assignor to Bendix Aviation Corporation, Teterboro, N. J., a corporation of Delaware Application November 17, 1948, Serial No. 60,585

15 Claims. (Cl. 128—142)

The present invention relates to pressure demand oxygen regulators and more particularly to the operation and regulation of the demand valve of such a regulator.

An object of my present invention is to provide a control mechanism for the demand valve of an oxygen demand regulator by means of which the flow of oxygen is controlled by the respiratory responsive diaphragm incorporated in such a regulator and by which pressure responsive means acting upon the control mechanism will increase the flow of oxygen with decrease in the ambient pressure.

A further object of my invention is to provide a demand valve control mechanism of the character indicated by which the demand valve is controlled by the respiratory responsive diaphragm during safety pressure breathing and in which the control of the demand valve by the respiratory responsive diaphragm is bypassed to permit operation of the demand valve by pressure responsive members during pressure breathing.

Another object of the present invention is to provide a demand valve control mechanism for a demand regulator by means of which a positive pressure can be applied to the respiratory responsive diaphragm of the regulator for testing the oxygen flow through the regulator at sea level, and by which the positive pressure may be continuously applied to the respiratory responsive diaphragm so that an increased flow of oxygen will be delivered by the regulator independently of the ambient pressures affecting the regulator.

Still another object of this invention is to provide a demand valve control mechanism in which the application of the positive pressure to the respiratory responsive diaphragm of the regulator does not affect the operation of the demand valve during pressure breathing periods.

Still another object of my invention is to provide a control mechanism and a demand valve for a demand regulator whereby the pressure of the oxygen delivered by the regulator may be altered to meet particular oxygen requirements.

Yet a further object of this invention is to provide a novel demand valve for an oxygen demand regulator in which the pressures built up behind the valve are counterbalanced by spring pressures and by diaphragm pressures applied through a compound lever system.

Yet another object of my invention is to provide a control mechanism for the demand valve of an oxygen demand regulator which shall consist of few and simple parts, be relatively inexpensive to manufacture, which shall be positive and automatic in its operation, which shall have a large variety of application and yet be practical and efficient to a high degree in use.

Other objects of this invention will in part be obvious and in part hereinafter pointed out.

Figure 2:
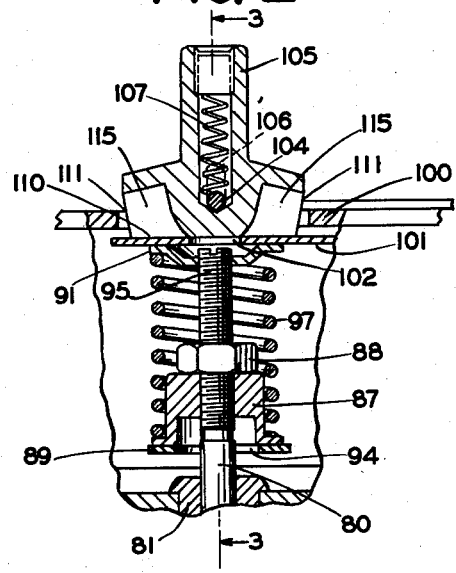
Figure 3:
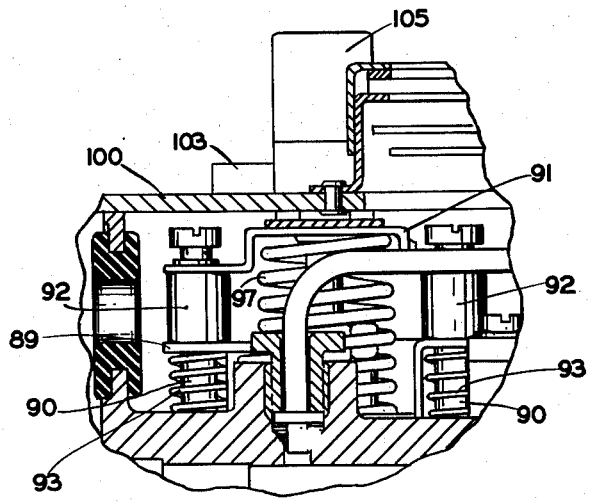

In the accompanying drawings forming a part of this specification in which one of the various possible illustrative embodiments of my invention is shown and wherein similar reference characters designate corresponding parts throughout the several views, Fig. 1 is a vertical cross-sectional view of an oxygen demand regulator, portions of which are shown in elevation, of the novel demand valve and the control mechanism therefor, Fig. 2 is a cross-sectional view, portions being in elevation, of the push button arrangement for applying the positive pressure to the pressure responsive diaphragm, while Fig. 3 is another cross-sectional view, portions of which are shown in elevation, taken along the line 3—3 of Fig. 2.

Referring now in detail to the drawings, the numeral 10 designates a portion of an oxygen demand regulator housed in a casting 11. Fixed within a recess 12 of the casting 11 is a demand valve seat 13 encompassing a port 14 which registers with an oxygen inlet port 15 connected to the pressure reducing chamber (not shown) of the oxygen demand regulator. Coacting with the demand valve seat 13 is a valve 18 fixed to a valve rod 19 received in a bushing 20 fixed within the recess 12. The valve 18 seals the oxygen inlet port 15 and prevents the oxygen from entering the chamber 21 formed within the recess 12 by the valve seat 13, the chamber 21 being connected by passages 22 and 23 to the injector nozzle (not shown) of the demand regulator.

The bottom of the casting 11 is formed with dependent side walls 25 which together with the respiratory responsive diaphragm assembly 26 fixed over the casting as by screws 27, form a sealed chamber 30 within the regulator. The chamber 30 is connected by suitable means (not shown) to the mask so that the suction of the mask user will operate the demand valve 18.

The diaphragm assembly 26 comprises an annular member 32 having fixed thereover a membrane or diaphragm 33. The diaphragm 33 has fixed to its center on either side thereof two pressure plates 34 and 35. The plates are made integral with a bushing 36 fixed to the diaphragm, said bushing being provided with a groove 39 for the purposes hereinafter appearing. A pin 40 is slidably received within the bushing 36, said pin being provided with washers 41 abutting said bushing.

It will be understood by those versed in the art that the negative pressure or suction in the chamber 30 due to the inhalation of the mask user will cause the diaphragm 33 to rise carrying therewith the plates 34 and 35, the bushing 36 and the pin 40. The exhalation of the mask wearer will create a positive pressure within the chamber 30 thereby causing the diaphragm 33 and its attendant elements to drop into the position as shown in Fig. 1. The rise and fall of the diaphragm is used for opening and closing the demand valve 18.

To this end the valve stem 19 has threaded therethrough a screw 45, the lower end of which passes through an elongated opening 46 of a lever 47 pivoted within the casting 11 as at 48. On the opposite side of the pivot 48, the lever 47 is connected by a screw 50 to a biasing means comprising a coil compression spring 51 within a recess 52 of the casting 11, and a spring retainer 53 threaded to the screw 50. It will be appreciated that the bias of the spring 51 acts in a downward direction on the lever 47 tending to hold the valve 18 against the demand valve seat 13, thus sealing the oxygen inlet 15.

The pivoted lever 47 is connected by way of a pin 55 fixed to the far end of said lever by the screws 56 to the diaphragm 33 by a counterbalanced lever 57 pivoted within the casting 11 as at 58. The pin 55 abuts the pivoted lever 57 so that any motion of the lever 57 will be transmitted to the lever 47 to operate the demand valve 13. The lever 57 is formed at its inward end with an elongated opening 59 which encompasses the bushing 36 within the groove 39 therein. The rise and fall of the diaphragm 33 due to the breathing pressures of the chamber 30 will pivot the lever 57 about its pivot 58 by virtue of its connection to the bushing 36. The oscillations of the lever 57 are transmitted to the lever 47 by the abutment pin 55 of the lever 47. The lever 47 will thus be oscillated in a clockwise direction against the bias of the spring 51 to open the demand valve 13, the spring 51 tending to close the demand valve upon exhalation pressure being applied within the chamber 30.

Means are now provided for opening the demand valve of the regulator to increase the flow of oxygen therethrough in response to the decreasing ambient pressure in which the regulator is being used.

To this end the regulator is provided with an enclosure 60 fixed to the casting 11 as by the screws 27, said enclosure being vented. Fixed within the enclosure 60 are two nested aneroids 61, only one being shown. The decreasing ambient pressure affects the aneroids to permit their sequential expansion with decrease in ambient pressure so that the inner aneroid moves its bottom plate 62 against the bottom plate 63 of the outer aneroid. The sequential expansion of the aneroids will permit spring 64 to apply an increasing pressure to the diaphragm 33 through a screw 65 and a button 66 threaded therethrough as will hereinafter appear.

Fixed within the casting 11 as by the screws 27 is a ring 70 having pivoted thereto as at 71 and 72 two diametrically opposed arms 73 and 74, respectively. The arm 74 is so disposed within the regulator that its upper surface abuts the pin 40 received within the bushing 36 of the respiratory responsive diaphragm 33. The arm 71 has fixed thereto as by screw 76, an adjustable arm 77, the screw 76 passing through an elongated slot 78 therein. The inner end of said arm is formed with an upturned toe 79 which abuts the arm 74.

It will be apparent that the arm 77 may be moved so as to adjust the point of abutment of the toe 79 with the arm 74. It is thus possible by adjusting the length of the arm 77 to vary the moment arms of the linkage system described so that the pressure of the oxygen delivered to the mask may be varied for predetermined altitudes in accordance with the preset requirements.

Under normal safety pressure breathing, the inhalation and exhalation of the mask user will cause the respiratory responsive diaphragm 33 to rise and fall thereby oscillating the lever 57 by virtue of its connection with said diaphragm through the bushing 36. The movement of the lever 57 will oscillate the lever 47 to open and close the demand valve 13. As the ambient pressure decreases, the aneroids 61 will expand bringing the button 66 into engagement with the arm 73. The decrease in the ambient pressure will increase the pressure of the button 66 against the lever 73 thereby exerting a force on the pin 40. It will be noted that the upper end of the pin 40 abuts the lever 47 at a point closer to the pivot 48 than that of the abutting pin 55. The force then of the expanding aneroids 61 is applied directly through the pin 40 to the balanced lever 47.

The oxygen regulator is used at altitudes up to 50,000 feet to supply oxygen at required pressures. However, the regulator acts as a diluter demand oxygen regulator up to about 32,000 feet, delivering a mixture of air and oxygen to approximate the oxygen pressure within the lungs at the 5,000 foot level. The air inlet of the oxygen regulator is gradually closed as the altitude increases so that at the 32,000 foot level, 100 percent oxygen is delivered to the mask, as is well known in the art. The respiratory pressures applied by the mask user to the chamber 30 will cause the diaphragm 33 to apply a force to the end of the counterbalanced lever 57. The movement of the lever 57 is transmitted to the end of the balanced lever 47 by way of pin 55. Since the respiratory pressures are applied to the ends of the two levers, it will be evident that the very small force of suction is greatly magnified by the linkage system to open the demand valve 13.

As the ambient pressure decreases the expanding aneroids 61 will begin to apply a positive pressure to the diaphragm 33 at about 25,000 feet to increase the flow of oxygen through the regulator. Safety pressure breathing will thus begin at about this altitude when the button 66 abuts against the arm 73. The force applied to the arm 73 is transmitted to the arm 74 to the pin 40 of the diaphragm. Since the positive pressure is initially small, the suction applied to chamber 30 will deflect the diaphragm 33 as previously described, the diaphragm being maintained slightly deflected due to the pressure of the pin 40 on plates 34, 35. Since the pin 40 acts directly on the balanced lever 47, the force thereof is added to that of the diaphragm lever 57 to open the demand valve 13; the suction in chamber 30 deflecting the diaphragm to move the lever 57 through bushing 36 movable now with respect to the relatively stationary pin 40.

As the ambient pressure decreases due to increasing altitude, the pressure applied by the button 66 to the arms 73 and 74 will increase. The increasing pressure of the button on pin 40 will eventually override any suction pressure within chamber 30, so that the force of the expanding aneroids 61 alone acts upon the lever 47 to open the demand valve.

Means are now provided to apply a small positive pressure to the diaphragm to permit the demand valve 13 to be opened for testing the flow of oxygen through the regulator at sea level and/or for applying a small constant pressure to the diaphragm to increase the flow of oxygen as the demand therefor might arise.

To this end there is provided within the regulator 10 a slidable rod 80 received within a bushing 81 fixed in an opening 82 of the casting 11. A screw 83 threaded into the lower end of the rod 80 holds a washer 84 and shims 85 to the rod 80. The upper end of the rod 80 is formed with a threaded portion 86 which is threaded through a retaining nut 87 locked in place by a locknut 88. The retaining nut 87 rests in a bracket 89 which is slidably received over two rods 90 fixed within the casting 11. A similar bracket 91 is provided which is inverted and slidably received on the rods 90 but separated from the bracket 89 by a spacer 92. The bracket 89 is resiliently supported by a compression spring 93 encompassing the rods 90.

The brackets 89 and 91 are formed with centrally disposed openings 94 and 95, respectively, to permit the movement of the rod 80 therethrough. The retaining nut 87 is formed with a shoulder 96, the shoulder forming a seat for a compression spring 97, the upper end of which abuts the underside of the bracket 91 to form a resilient support for the rod 80.

Fixed in a suitable manner to the underside of the cover plate 100 of the regulator 10 (Fig. 2) is a leaf spring 101 formed with an opening 102 which is aligned with the rod 80 and the openings 94 and 95 of the brackets. Fixed to the upper face of the cover plate 100 are two bearings 103 (only one being shown) in which is journalled a horizontal shaft 104. Rotatably mounted on the shaft 104 is a push button 105, the shaft 104 passing through the push button by way of an elongated slot 106 therein. A compression spring 107 within the push button 105 retains and returns the push button to the position shown in Fig. 2.

Depressing the push button 105 will deflect the leaf spring 101 which will depress the brackets 91 and 89 as a unit due to the spacers 92 against the action of springs 93. The rod 80 will thus be moved downwardly so that the screw 83 will abut the end of the lever 57. The lever 57 will thus be rotated in a counter-clockwise direction to open the demand valve.

The lower end of the push button 105 is provided with a bottom cam surface 110 and two side cam surfaces 111. The bottom cam surface 110 is shown abutting the leaf spring 101. The depression of the push button will, as previously stated, move the rod 80 against the lever 57, the upper end of the rod 80 passing through the opening 102 of the leaf spring and abutting the cam surface 110 of the push button. The pressure applied to the lever 57 to open the demand valve will determine the oxygen pressure delivered to the mask.

To apply a constant pressure of about 2 inches of water pressure to the respiratory responsive diaphragm 33, the push button may be rotated about the shaft 104 to bring the cam surface 111 against the leaf spring 101. The push button in this position will maintain the leaf spring 101 depressed. It will be noted that the edges of the lower portion of the push button are provided with the recesses 115. The rod 80 due to the downward movement of the brackets 89 and 91 against the bias of the springs 93 may now pass upwardly through the opening 102 of the leaf spring 101 and be received within the recesses 115 of the push button. The pressure now exerted on the lever 57 for opening the demand valve 13 is now due to the bias of the spring 97. This pressure can be adjusted to any desired figure by use of proper springs and by the number of shims 85 used.

The positive pressure thus applied to the diaphragm will permit oxygen to be delivered to the mask wearer with a slight increase in the pressure thereof. Since the connection of the lever 57 is to the diaphragm 33, and the pressure exerted by the expanding aneroids 61 is by the slidably received pin 40, the positive pressure exerted by the push button will in no way effect the operation of the regulator during pressure breathing periods.

It will thus be seen that there is provided a novel control mechanism for the demand valve of an oxygen demand regulator in which the several objects of this invention are achieved and which is well adapted to meet the conditions of practical use.

As various embodiments may be made of the above invention and as various changes might be made in the embodiment above set forth, it will be understood that all matter herein contained or illustrated in the accompanying drawings is to be interpreted as illustrative and not in a limiting sense.

Having thus described my invention, I claim as new and desire to secure by Letters Patent:

1. In a demand regulator having a casing adapted for connection to a breathing mask, a respiratory responsive diaphragm and a demand valve within the casing, a control mechanism for said demand valve comprising a pivoted lever for opening and closing said demand valve, a second pivoted lever actuated by the deflection of said respiratory responsive diaphragm for moving said first lever to open said demand valve, and means responsive to decreasing ambient pressure for applying pressure on said first lever independently of said second lever to open said demand valve.

2. In a demand regulator having a casing adapted for connection to a breathing mask, a respiratory responsive diaphragm and a demand valve within the casing, a control mechanism for said demand valve comprising a pivoted lever for opening and closing said demand valve, a second pivoted lever actuated by the deflection of said respiratory responsive diaphragm for moving said first lever to open said demand valve, and means responsive to decreasing ambient pressure for applying pressure on said first lever independently of said second lever to open said demand valve, said last means including a pivoted lever system having adjustable moment arms.

3. In a demand regulator having a casing adapted for connection to a breathing mask, a respiratory responsive diaphragm and a demand valve within the casing, a control mechanism for said demand valve comprising a pivoted lever for opening and closing said demand valve, a second pivoted lever actuated by the deflection of the respiratory responsive diaphragm for moving said first lever to open said demand valve, and means including two pivoted coacting arms adapted to apply a positive pressure to the diaphragm, one of said arms being operatively connected to displace said diaphragm and the moment arm of one of said arms being adjustable.

4. In a demand regulator having a casing adapted to be connected to a breathing mask, a respiratory responsive diaphragm and a demand valve within the casing, a control mechanism for said demand valve comprising a pivoted lever for opening said valve, spring means coacting with said lever tending to close said valve, a second pivoted lever actuated by the deflection of said diaphragm for moving said first lever to open said valve, abutment means slidably receivable through said diaphragm and coacting therewith and said first lever, and two pivoted coacting arms for applying force to said abutment means to open said valve, the moment arm of one of said arms being adjustable.

5. In a demand regulator having a casing adapted to be connected to a breathing mask, a respiratory responsive diaphragm and a demand valve within the casing, a control mechanism for said demand valve comprising a pivoted lever for opening said valve, spring means coacting with said lever tending to close said valve, a second pivoted lever actuated by the deflection of said diaphragm for moving said first lever to open said valve, means containing a push button coacting with said second lever to override said diaphragm to open said valve, abutment means slidably receivable through said diaphragm and coacting therewith and said first lever, and two pivoted coacting arms for applying force to said abutment means to open said valve, the moment arm of one of said arms being adjustable.

6. In a demand regulator having a casing adapted to be connected to a breathing mask, a respiratory responsive diaphragm and a demand valve within the casing, a control mechanism for said demand valve comprising a pivoted lever for opening said valve, spring means coacting with said lever tending to close said valve, a second pivoted lever actuated by the deflection of said diaphragm for moving said first lever to open said valve, means containing a push button coacting with said second lever to override said diaphragm to open said valve, said push button including spring means for applying a resilient force to said second lever, abutment means slidably receivable through said diaphragm and coacting therewith and said first lever, and two pivoted coacting arms for applying force to said abutment means to open said valve, the moment arm of one of said arms being adjustable.

7. In a demand regulator having a casing adapted for connection to a breathing mask, a respiratory responsive diaphragm and a demand valve within said casing, a control mechanism for said demand valve comprising a first lever having a pivot intermediate the ends thereof, a connection between one end of said first lever and said demand valve, a second pivoted lever connected at one end thereof to said respiratory responsive diaphragm, a pin carried by said first lever at the opposite end thereof for engagement with said second lever, and adjustable spring means engaging said first lever intermediate its pivot and said pin, said spring means being operative to bias said first lever to urge said demand valve to a closed position and said pin in engagement with said second pivoted lever, said second pivoted lever being actuated by deflection of said respiratory responsive diaphragm to angularly displace said first lever about its pivot against the bias of said spring means to open said demand valve.

8. In a demand regulator having a casing adapted for connection to a breathing mask, a respiratory responsive diaphragm and a demand valve within said casing, a control mechanism for said demand valve comprising a first lever having a pivot intermediate the ends thereof, a connection between one end of said first lever and said demand valve, a second lever having a pivot intermediate the ends thereof, a pin carried by said first lever at the opposite end thereof for engagement with said second lever, and a connection between one end of said second lever and said respiratory responsive diaphragm, resilient means engaging said first lever and operative to maintain said demand valve in a closed position and to engage said pin with said second lever intermediate the pivot of said second lever and said connection between the second lever and said respiratory responsive diaphragm, said second lever being rotated by deflections of said respiratory responsive diaphragm to rotate said first lever to open said demand valve, and actuating means including a push button coacting with the free end of said second lever for rotating said second lever independently of said respiratory responsive diaphragm to rotate said first lever and open said demand valve.

9. In a demand regulator having a casing adapted for connection to a breathing mask, a respiratory responsive diaphragm and a demand valve within said casing, a control mechanism for said demand valve comprising a first lever having a pivot intermediate the ends thereof, a connection between one end of said first lever and said demand valve, a second lever having a pivot intermediate the ends thereof, a pin carried by said first lever at the opposite end thereof for engagement with said second lever, and a connection between one end of said second lever and said respiratory responsive diaphragm, resilient means engaging said first lever and operative to maintain said demand valve in a closed position and to engage said pin with said second lever intermediate the pivot of said second lever and said connection between the second lever and said respiratory responsive diaphragm, said second lever being rotated by deflections of said respiratory responsive diaphragm to rotate said first lever to open said demand valve, and actuating means including a push button coacting with the free end of said second lever for rotating said second lever independently of said respiratory responsive diaphragm to rotate said first lever and open said demand valve, said actuating means being normally disengaged from said second lever.

10. In a demand regulator having a casing adapted for connection to a breathing mask, a respiratory responsive diaphragm and a demand valve within said casing, a control mechanism for said demand valve comprising a first lever having a pivot intermediate the ends thereof, a connection between one end of said first lever and said demand valve, a second lever having a pivot intermediate the ends thereof, a pin carried by said first lever at the opposite end thereof for engagement with said second lever, and a connection between one end of said second lever and said respiratory responsive diaphragm, resilient means engaging said first lever and operative to maintain said demand valve in a closed position and to engage said pin with said second lever intermediate the pivot of said second lever and said connection between the second lever and said respiratory responsive diaphragm, said second lever being rotated by deflections of said respiratory responsive diaphragm to rotate said first lever to open said demand valve, and actuating means including a push button and a spring, said push button being fixed against said spring, said actuating means being normally disengaged from said second lever and movable into engagement therewith to provide a resilient pressure on said second lever.

11. In a demand regulator having a casing adapted for connection to a breathing mask, a respiratory diaphragm and a demand valve within said casing, a control mechanism for said demand valve comprising a pivoted lever for opening and closing said demand valve, a second pivoted lever actuated by the deflection of the respiratory responsive diaphragm for moving said first lever to open said demand valve, a pin slidably mounted in said diaphragm and engageable with said first lever, a first arm pivoted at one end and engageable with said pin at the other end thereof, a second arm pivoted at one end and engageable with said first arm at the other end thereof, and means responsive to decreasing ambient pressure for engaging said second arm with said first arm, said first arm with said pin, and said pin with said first lever, whereby said valve is opened at a predetermined ambient pressure.

12. In a demand regulator having a casing adapted for connection to a breathing mask, a respiratory responsive diaphragm and a demand valve within said casing, a control mechanism for said demand valve comprising a pivoted lever for opening and closing said demand valve, a second pivoted lever actuated by the deflection of the respiratory responsive diaphragm for moving said first lever to open said demand valve, means including a push button coacting with said second lever to override said diaphragm to open said demand valve, a pin attached to said second lever and engageable with said first lever, a pair of pivoted coacting arms, one of said arms engageable with said pin, and means responsive to decreasing ambient pressure engageable with said second arm whereby said coacting arms, pin and first lever are brought into engagement and open said demand valve at a predetermined ambient pressure.

13. In a demand regulator having a casing adapted for connection to a breathing mask, a respiratory responsive diaphragm and a demand valve within said casing, a control mechanism for said demand valve comprising a pivoted lever for opening and closing said demand valve, a second pivoted lever actuated by the deflection of said respiratory responsive diaphragm for moving said first lever to open said demand valve, a pin slidably mounted in said diaphragm and engageable with said diaphragm and said first lever, and means responsive to decreasing ambient pressure in engagement with said pin, said ambient pressure responsive means being operative to sequentially engage said pin with said diaphragm and with said first lever, whereby said diaphragm is deflected to actuate said second lever and open said demand valve at a first predetermined ambient pressure, and said first lever is actuated independently of said second lever to open said demand valve at a second predetermined ambient pressure.

14. In a demand regulator having a casing adapted for connection to a breathing mask, a respiratory responsive diaphragm and a demand valve within said casing, a control mechanism for said demand valve comprising a pivoted lever for opening and closing said demand valve, a second pivoted lever actuated by the deflection of said respiratory responsive diaphragm for moving said first lever to open said demand valve, a pin slidably mounted in said diaphragm and engageable with said diaphragm and said first lever, a pair of coacting pivoted arms, one of said arms being engageable with said pin, and pressure actuated means responsive to ambient pressure, said pressure responsive means being engageable with the other of said coacting arms and operative upon decreasing ambient pressure to actuate said coacting arms whereby said pin is sequentially engaged with said diaphragm and said first lever to thereby first deflect said diaphragm and actuate said second lever to open said demand valve, and secondly to actuate said first lever to open said demand valve independently of said second lever.

15. In a demand regulator having a casing adapted for connection to a breathing mask, a respiratory responsive diaphragm and a demand valve within said casing, a control mechanism for said demand valve comprising a pivoted lever for opening and closing said demand valve, a second pivoted lever actuated by the deflection of said respiratory responsive diaphragm for moving said first lever to open said demand valve, and means responsive to changing ambient pressure for sequentially deflecting said diaphragm to actuate said second lever and thereby open said demand valve and actuating said first lever independently of said second lever to open said demand valve.

BRADFORD B. HOLMES.

REFERENCES CITED

The following references are of record in the file of this patent:

UNITED STATES PATENTS

| Number | Name | Date |
| --- | --- | --- |
| 1,093,975 | Clarke | Apr. 21, 1914 |
| 1,848,232 | Swope | Mar. 8, 1932 |
| 1,926,069 | Sutton | Sept. 12, 1933 |
| 2,220,905 | Johnson | Nov. 12, 1940 |
| 2,378,047 | Strange | June 12, 1945 |
| 2,383,801 | Johnson | Aug. 28, 1945 |

FOREIGN PATENTS

| Number | Country | Date |
| --- | --- | --- |
| 704,049 | Germany | of 1941 |
| 236,133 | Switzerland | of 1941 |
| 439,183 | Great Britain | Dec. 2, 1935 |